United States Patent
Giraud et al.

(10) Patent No.: US 10,018,227 B2
(45) Date of Patent: Jul. 10, 2018

(54) ELECTRICAL FOOD PREPARATION DEVICE COMPRISING A WORKING TOOL THAT REMOVABLY ENGAGES ON A DRIVE MECHANISM

(71) Applicant: SEB S.A., Ecully (FR)

(72) Inventors: Jean-Baptiste Giraud, Saint-Jean-sur-Mayenne (FR); Jean-Yves Beaudet, Saint-Julien-du-Terroux (FR); Johan Nespoux, Laval (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 14/914,702

(22) PCT Filed: Aug. 21, 2014

(86) PCT No.: PCT/FR2014/052111
§ 371 (c)(1),
(2) Date: Feb. 26, 2016

(87) PCT Pub. No.: WO2015/028748
PCT Pub. Date: Mar. 5, 2015

(65) Prior Publication Data
US 2016/0198902 A1    Jul. 14, 2016

(30) Foreign Application Priority Data

Aug. 29, 2013 (FR) ...................................... 13 58286

(51) Int. Cl.
*A23N 4/04* (2006.01)
*F16D 1/112* (2006.01)
(Continued)

(52) U.S. Cl.
CPC ............. *F16D 1/112* (2013.01); *A47J 43/075* (2013.01); *A47J 43/0716* (2013.01); *A47J 43/08* (2013.01); *A47J 43/085* (2013.01); *F16D 1/10* (2013.01)

(58) Field of Classification Search
CPC ...... A47J 43/0716; A47J 43/075; A47J 43/08; A47J 43/085; F16D 1/10; F16D 1/112
(Continued)

(56) References Cited

U.S. PATENT DOCUMENTS 3,970,258 A * 7/1976 Mantelet ............... A47J 43/046
                                                        241/282.1
4,111,372 A * 9/1978 Hicks .................. A47J 43/0772
                                                        241/282.1

FOREIGN PATENT DOCUMENTS

CN        202665185      *  1/2013
CN        202665185 U       1/2013
(Continued)

*Primary Examiner* — Dana Ross
*Assistant Examiner* — Joseph Iskra
(74) *Attorney, Agent, or Firm* — The Webb Law Firm

(57) ABSTRACT

An electrical food preparation device including a drive mechanism (3) rotated by a motor and a working tool (4, 5, 6, 7) including a bushing that removably engages on the drive mechanism, the drive mechanism including a section provided with at least one drive ramp that mates with a complementary drive ramp carried by said bushing in order to rotate said working tool, the drive ramp having an inclination designed such that the rotation of the drive mechanism in the direction of rotation of the motor generates a force on the bushing that tends to keep it engaged on the drive mechanism, the drive mechanism also including at least one retaining surface (33) that comes into contact with a stop carried by the working tool when the drive mechanism rotates in the reverse direction, the retaining surface and the stop having shapes that mate each other to prevent the
(Continued)

bushing from rising back up along the drive mechanism when the motor stops suddenly, wherein the retaining surface is provided on a different part of the drive mechanism from the section supporting the drive ramp.

9 Claims, 4 Drawing Sheets

(51) Int. Cl.
    *A47J 43/08*     (2006.01)
    *A47J 43/07*     (2006.01)
    *F16D 1/10*     (2006.01)

(58) Field of Classification Search
    USPC .............. 99/537, 501, 502; 241/199.12, 277, 241/282.1, 282.2
    See application file for complete search history.

(56) References Cited

FOREIGN PATENT DOCUMENTS

| | | | |
|---|---|---|---|
| DE | 102010026963 | A1 | 1/2012 |
| EP | 2433534 | A1 | 3/2012 |
| FR | 2286632 | A1 | 4/1976 |
| WO | WO2010133431 | * | 10/2010 |
| WO | 2010133431 | A1 | 11/2010 |

* cited by examiner

ELECTRICAL FOOD PREPARATION DEVICE COMPRISING A WORKING TOOL THAT REMOVABLY ENGAGES ON A DRIVE MECHANISM

CROSS-REFERENCE TO RELATED APPLICATIONS

This application is the United States national phase of International Application No. PCT/FR2014/052111 filed Aug. 21, 2014 and claims priority to French Patent Application No, 1358286 filed Aug. 29, 2013, the disclosures of which are hereby incorporated in their entirety by reference.

FIELD OF THE INVENTION

This invention pertains to the general technical field of household electrical appliances for preparing food, comprising a drive mechanism rotated by a motor, and a working tool equipped with a bushing that removably engages on the drive mechanism, the drive mechanism comprising a section equipped with at least one drive ramp that mates with a complementary drive ramp carried by the bushing, in order to rotate the working tool.

DESCRIPTION OF RELATED ART

There already exists, in patent applications FR 2 286 632 and WO2010/133431, a food preparation device comprising a working container with a bottom equipped with a drive mechanism on which a working tool removably engages, the drive mechanism possessing drive ramps with an incline designed so that the rotation of the drive mechanism in the direction of rotation of the motor exerts a force on the bushing that tends to keep it engaged on the drive mechanism, thus preventing the tool from rising when acting on the ingredients present in the container. The drive mechanism also comprises retaining surfaces that come into contact with stops carried by the bushing when the drive mechanism rotates in the reverse direction, in order to prevent the bushing from rising up along the drive mechanism when the motor stops suddenly.

A device equipped with such a coupling mechanism offers the advantage of preventing the working tool from disengaging from the drive mechanism when the motor is stopped suddenly by the activation of a safety mechanism, as such an sudden stop occurs, for example, when the device is equipped with a lid safety mechanism and the user opens the lid of the container while the device is operating.

However, such a coupling mechanism presents the disadvantage of using a drive mechanism and a bushing with complex shapes that make them difficult and costly to produce.

Consequently, one purpose of this invention is to provide an electrical food preparation device comprising a working tool removably engaged on a drive mechanism by means of a coupling mechanism that remedies these disadvantages.

SUMMARY OF THE INVENTION

To this end, the invention pertains to an electrical food preparation device comprising a drive mechanism rotated by a motor, and a working tool comprising a bushing that removably engages on the drive mechanism, the drive mechanism comprising a section equipped with at least one drive ramp that mates with a complementary drive ramp carried by the bushing, in order to rotate the working tool, the drive ramp having an incline designed so that the rotation of the drive mechanism in the direction of rotation of the motor exerts a force on the bushing that tends to keep it engaged on the drive mechanism, the drive mechanism also comprising at least one retaining surface that comes into contact with a stop carried by the working tool when the drive mechanism rotates in the reverse direction, the retaining surface and the stop having shapes that mate each other to prevent the bushing from rising up along the drive mechanism when the motor stops suddenly, characterized in that the retaining surface is arranged on a different part of the drive mechanism than the section supporting the drive ramp.

The term "section" refers to a portion of the drive mechanism extending between two planes that are perpendicular to the axis of rotation of the drive mechanism.

Such a device offers the advantage of having a drive mechanism that comprises retaining surfaces arranged on one portion of the drive mechanism that is axially offset with respect to the section receiving the drive ramps, thus making it easier to produce the drive mechanism and/or affording greater freedom in the production of the shapes of the retaining surfaces and the drive ramps.

In another characteristic of the invention, the one or more retaining surface(s) are arranged at a greater radial distance from the longitudinal axis of the drive mechanism than the one or more drive ramp(s).

Such a characteristic makes it possible to exert less force on the retaining surfaces for a given locking torque, thereby making it possible to have smaller retaining surfaces.

In another characteristic of the invention, the retaining surface extends parallel to the axis of the drive mechanism or is sloped downward.

The phrase "sloped downward" means that the retaining surface slopes toward the side opposite the top of the drive mechanism by which the working tool is engaged on the drive mechanism.

Such a retaining surface offers the advantage of being simple to produce and of having a shape that prevents the working tool from rising up the drive mechanism when the stop hits the retaining surface.

In another characteristic of the invention, the one or more retaining surface(s) are carried by a disc arranged at the base of the drive mechanism.

Such a characteristic offers the advantage of providing a separate surface from the section supporting the drive ramp that is simple to produce.

In another characteristic of the invention, the disc has a larger diameter than the diameter of the drive mechanism in the section supporting the one or more drive ramp(s).

In another characteristic of the invention, the one or more retaining surface(s) extend roughly radially to the drive mechanism, and the disc comprises, between two successive retaining surfaces, a peripheral edge that extends in a spiral.

In another characteristic of the invention, the one or more drive ramp(s) have a helical shape.

In another characteristic of the invention, the drive mechanism comprises three drive ramps spaced 120° apart from one another.

In another characteristic of the invention, the drive mechanism comprises three retaining surfaces spaced 120° apart from one another.

In another characteristic of the invention, the drive mechanism is arranged at the bottom of a working container.

In another characteristic of the invention, the device comprises a safety mechanism that can suddenly stop the rotation of the drive mechanism.

In another characteristic of the invention, the working container is closed by a lid, and the safety mechanism stops the motor when the lid is opened.

BRIEF DESCRIPTION OF THE DRAWINGS

The purposes, aspects and advantages of this invention will be better understood through the description provided below of one particular method of implementing the invention, provided as a non-limiting example, in reference to the attached drawings, in which.

DETAILED DESCRIPTION OF THE INVENTION

Only the components necessary to understand the invention have been depicted. To make it easier to read the drawings, the same components bear the same reference numbers from one figure to another.

Figure 1:
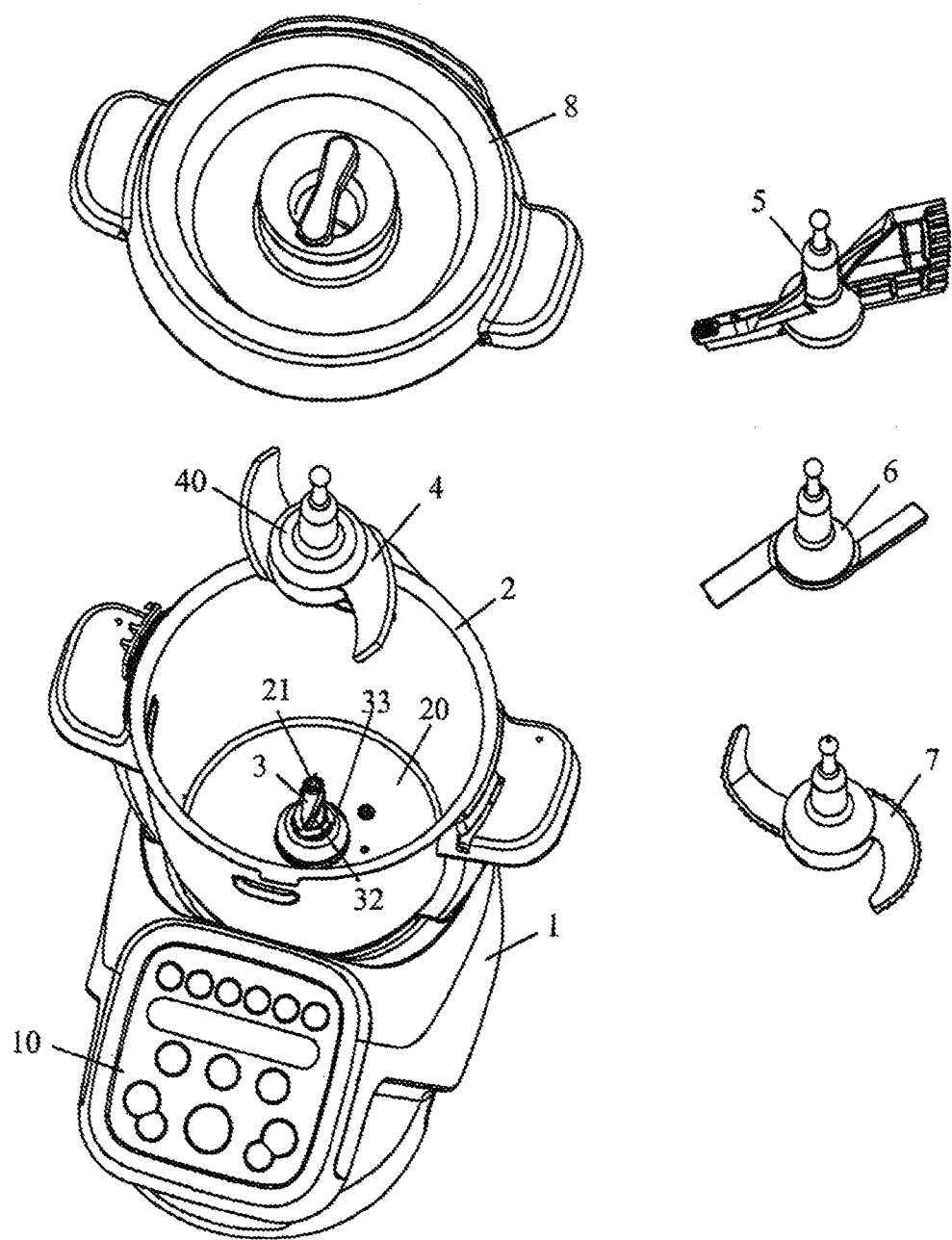
FIG. 1 is an exploded perspective view of a food preparation device according to one particular method of implementing the invention, the view also depicting several types of working tools that can be used in this device.

FIG. 1 depicts a food preparation device comprising a casing (1) made of plastic and a working container (2), advantageously made of stainless steel, which rests in a removable manner on the casing (1).

The working container (2) comprises a bottom (20) supporting a drive mechanism (3) driven by a motor (not depicted in the drawings) built into the casing (1), and the device comprises several working tools (4, 5, 6 and 7) that can be interchangeably coupled to the drive mechanism (3), each of the working tools (4, 5, 6 and 7) having a common central hub containing a bushing designed to engage removably on the drive mechanism (3).

The working container (2) comprises an upper end closed by a removable lid (8), and the device is advantageously equipped with a lid safety mechanism (not visible in the drawings) that stops the operation of the motor when the lid (8) is not locked onto the working container (2).

Preferably, the casing (1) is equipped with a hot plate, making it possible to heat the contents of the working container (2), the hot plate and the motor being operated by an electronic card arranged beneath a control panel (10) present on one front surface of the casing (1), this electronic card receiving the temperature value measured by a temperature sensor and regulating the power supply to the heating element so as to bring the contents of the working container (2) to a set temperature.

The drive mechanism (3) is supported by a drive system comprising a drive shaft (21) attached to the bottom (20) of the working container by guiding means that simultaneously freely rotate the drive shaft (21) perpendicularly to the bottom of the working container (2) and ensure the watertight property of the rotary connection, the drive shaft (21) passing through the bottom (20) of the working container and comprising an upper end equipped with flat spots onto which the drive mechanism (3) is engaged, as well as a lower end that couples with an interdependent spinning component of the motor when the working container is correctly placed on the casing (1).

Figure 2A:
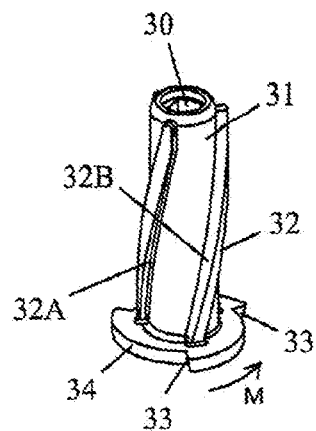
FIGS. 2A, 2B and 2C are a perspective view, top view and side view, respectively, of the drive mechanism equipping the bottom of the container of the device in FIG. 1.
Figure 2B:
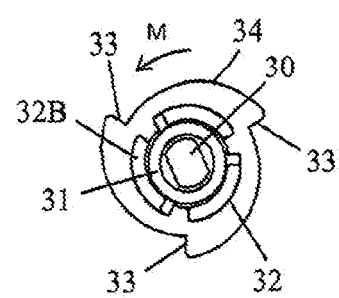
Figure 2C:
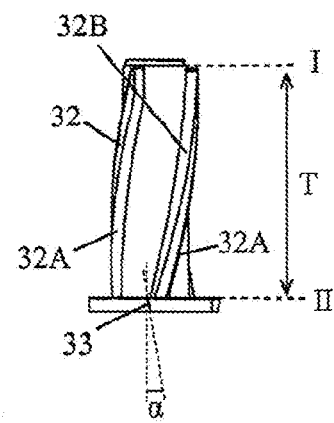

As shown in FIGS. 2A, 2B and 2C, the drive mechanism (2) comprises a section (T) with a cylindrical body (31) that extends longitudinally between two planes (I, II) perpendicular to the axis of rotation of the drive mechanism (3), the cylindrical body (31) comprising a central bore (30), equipped with flat spots, with a shape that is complementary to that of the upper end of the drive shaft (21) and comprising an external surface supporting three spiral ribs (32), spaced 120° apart from one another.

Figure 3A:
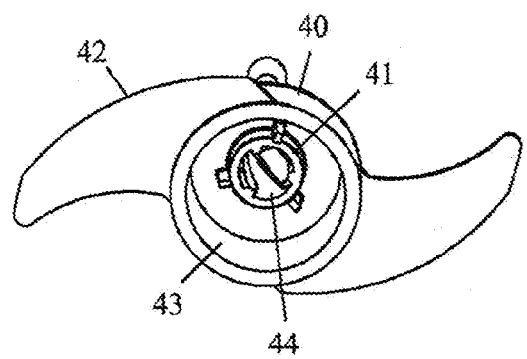
FIGS. 3A and 3B are a perspective view and a longitudinal cross-section view, respectively, of a cutting tool equipping the device in FIG. 1.
Figure 3B:
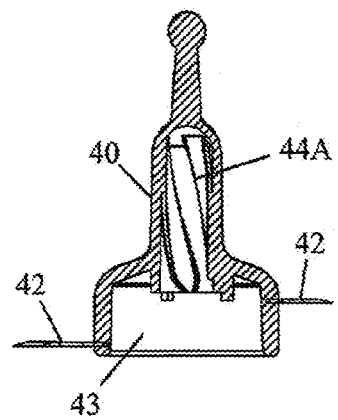
Figure 4:
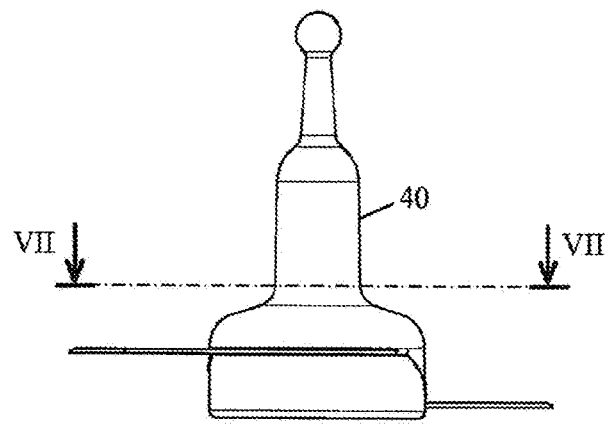
FIG. 4 is a side view of the cutting tool in FIG. 3A.

FIGS. 3A and 3B depict in greater detail one of the working tools (4, 5, 6 and 7) equipping the food preparation device in FIG. 1, this working tool consisting of a cutting tool (4) that can chop food placed in the bottom of the working container (2) and comprising a central hub (40) made of plastic advantageously molded over two curved stainless steel blades (42), arranged 180° apart from one another.

As shown in these drawings, the cutting tool (4) comprises a bushing (41) that is built into the central hub (40) and comprises an open lower end that extends into a cavity (43) arranged in the base of the central hub (40), this cavity (43) being open at its lower end. The bushing (41) comprises an internal bore receiving three spiral grooves (44) spaced 120° apart from one another, designed to receive the ribs (32) of the drive mechanism, the grooves (44) being wider than the width of the ribs (32) so that the spiral ribs (32) of the drive mechanism can engage easily through the grooves (44) of the bushing when the cutting tool (4) is put in place on the drive mechanism (3).

Figure 5:
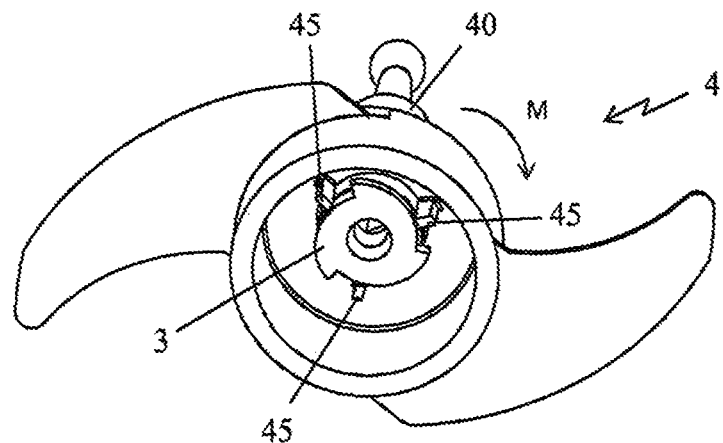
FIGS. 5 and 6 are, respectively, a perspective view of the cutting tool when the drive mechanism is engaged in the bushing, in a position of rotating the cutting tool and in a position of stopping the drive mechanism suddenly.

In the coupling mechanism thus created, when the drive mechanism (3) is rotated in the direction of the motor (M) depicted in FIGS. 2B and 5, the downward-turned edge of the ribs (32) of the drive mechanism form a spiral drive ramp (32A) that is supported by a complementary drive ramp (44A) of the central hub (40) consisting of the upward-turned edge of the groove (44).

More specifically in the invention, the drive mechanism (3) comprises retaining surfaces (33) that mate with stops (45) carried by the cutting tool (4) to stop the rotation of the drive mechanism (3) through the bushing (41), in the reverse direction of the motor direction (M), before the edge (32B) of the spiral rib opposite the drive ramp (32A) comes into contact with the edge (44B) of the groove opposite the complementary drive ramp (44A), in order to prevent the cutting tool (4) from rising up the drive mechanism (3) when the drive mechanism (3) is stopped suddenly.

As shown in FIGS. 2A and 2B, the retaining surfaces (33) are carried by a portion of the drive mechanism (3) that is separate from the section (T) comprising the drive ramps (32A), this portion preferably consisting of a disc (34) arranged beneath the cylindrical body (31).

The disc (34) has a larger diameter than the diameter of the drive mechanism (3) in the section (T) and comprises three retaining surfaces (33) arranged 120° apart from one another, the disc comprising, between each retaining surface (33), a spiral-shaped peripheral edge that connects the outer edge of the retaining surface (33) located above to the inner edge of the retaining surface (33) located below.

Preferably, the retaining surfaces (33) extend radially to the drive mechanism, in a plane passing through the axis of rotation of the drive mechanism (3), or are on sloped downward a few degrees so as to facilitate the release of the drive mechanism from the mold. The slope of the retaining surfaces, such as an angle α on the order of 5 to 20° with respect to the vertical plane, can also make it possible to exert a force to hold the cutting tool (4) in the bottom of the working container when the stops (45) hit the retaining surfaces (33) if the stops (45) are of a shape designed to mate with this sloped surface.

In the example depicted in FIGS. 3A and 3B, the stops (45) carried by the cutting tool (4) consist of three contacts with a rectangular cross-section arranged 120° apart from one another, in the extension of the lower end of the bushing (41), these stops (45) extending axially to the periphery of the bushing (41) and protruding inside the cavity (43) of the central hub (40) at a height designed to be supported by the retaining surfaces (33) located at the base of the drive mechanism (3) when the cutting tool (4) is spinning in the direction of the motor (M) with respect to the drive mechanism (3).

The operation of the device will now be described in reference to FIGS. 5 through 8.

When the user wishes to prepare food using the device, he engages the cutting tool (4), or one of the other available working tools (5, 6 or 7), on the drive mechanism (3), transfers the ingredients necessary for the recipe to the bottom of the working container (2), locks the lid (8) on top of the working container (2), and then presses the button arranged on the control panel (10) to start the operation of the motor.

Figure 7:
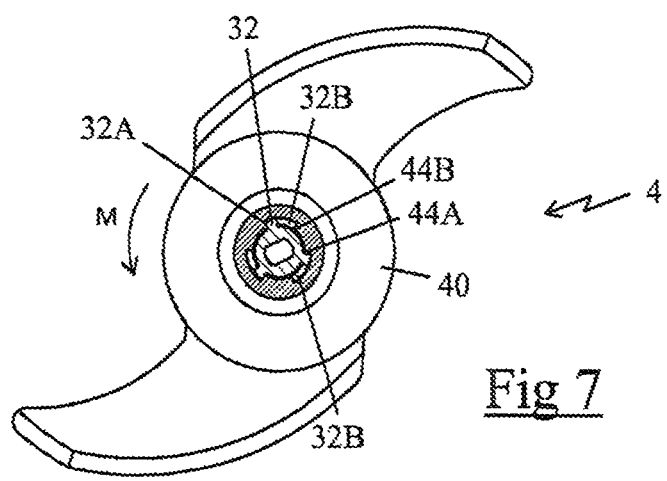
FIGS. 7 and 8 are cross-section views of the cutting tool along Line VII-VII in FIG. 4 when the drive mechanism is in the positions illustrated in FIGS. 5 and 6, respectively.
Figure 8:
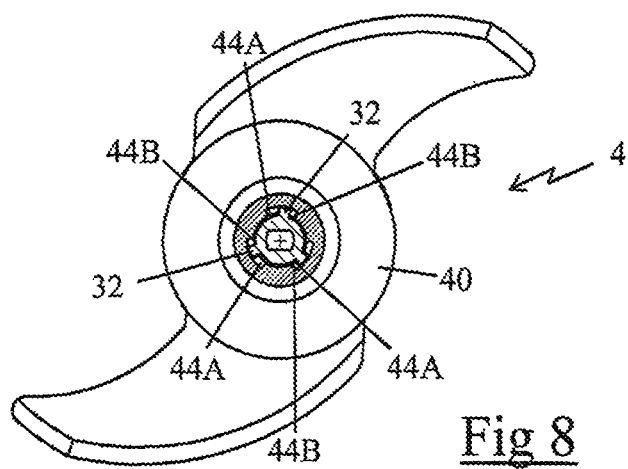

Starting the operation of the motor causes the rotation of the drive mechanism (3) in the direction of the motor (M) depicted in FIG. 5, such that the drive ramps (32A) of the drive mechanism, turned downward, are supported by the complementary drive ramps (44A) of the bushing (41), turned upward, as illustrated in FIG. 7, the driving force applied to the bushing (41) comprising a vertical component directed downward, which tends to hold the cutting tool (4) in the bottom of the working container (2).

Figure 6:
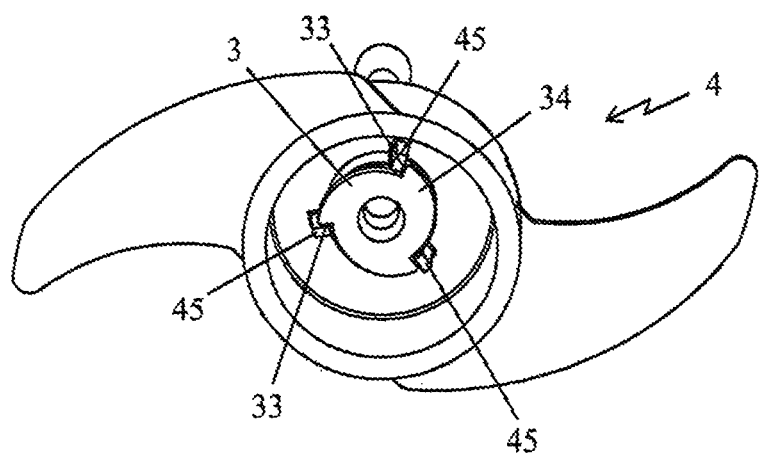

In case of a sudden braking of the drive mechanism (3), related, for example, to the activation of the safety mechanism upon opening the lid (8), the cutting tool (4) continues its rotation in the direction of the motor (M), propelled by its inertia and any inertia of the ingredients spinning in the bottom of the container, which causes a relative rotation of the drive mechanism (3) with respect to the cutting tool (4) in the reverse direction of the motor direction (M). This relative rotation of the cutting tool (4) on the drive mechanism (3) occurs until the retaining surfaces (33) of the drive mechanism (3) come into contact with the stops (45) carried by the cutting tool (4), as illustrated in FIG. 6, and this contact causes a sudden stop of the cutting tool (4) on the drive mechanism (3), thereby preventing the edge (32B) of the spiral ribs (32) opposite the drive ramp (32A) from coming into contact with the edge (44B) of the grooves (44) opposite the complementary drive ramp (44A). When the stop occurs, the orientation of the retaining surfaces (33) along a vertical or slightly downward-sloping plane makes it possible to prevent the cutting tool (4) from rising up with respect to the drive mechanism (3).

Of course, the operation of the device and the advantages of the coupling mechanism thus created remain the same regardless of the working tool (4, 5, 6 or 7) used, as said tools comprise a bushing and stops at all similar points to those described for the cutting tool (4).

The device thus created therefore offers the advantage of comprising a coupling mechanism of the working tool that guarantees that the working tool will be firmly held in the bottom of the container when the device is operating or when the drive mechanism is stopped suddenly.

In addition, the device thus created offers the advantage of comprising a coupling mechanism of the working tool that is easy and inexpensive to manufacture, particularly by molding, due to the positioning, in two separate longitudinal areas, of the shapes that drive the working tool in the direction of the motor, and of the shapes that stop the rotation of the working tool.

Of course, the invention is in no way limited to the method of implementation described and illustrated, which was provided only as an example. Modifications can still be made, particularly with regard to the composition of the various components or by substituting equivalent techniques, while still remaining within the scope of protection of the invention.

Thus, in one variation of implementation not depicted, the drive mechanism may comprise only two ribs, or more ribs spaced out over the periphery of the drive mechanism.

The invention claimed is:

1. An electrical food preparation device comprising a drive mechanism rotated by a motor, and a working tool comprising a bushing that engages removably on the drive mechanism, the drive mechanism comprising a section equipped with at least one drive ramp that mates with a complementary drive ramp carried by the bushing to rotate the working tool, the drive ramp having a slope that is designed such that the rotation of the drive mechanism in the direction of rotation of the motor, exerts a force on the bushing that tends to keep it engaged on the drive mechanism, the drive mechanism also comprising at least one retaining surface that comes into contact with a stop carried by the working tool when the drive mechanism rotates in the reverse direction, the retaining surface and the stop having shapes that mate with one another to prevent the bushing from rising up along the drive mechanism when the motor is stopped suddenly, wherein the retaining surface is arranged on a portion of the drive mechanism that is separate from the section supporting the drive ramp,
   wherein the at least one drive ramp is arranged along a cylindrical body of the drive mechanism and the at least one retaining surface is arranged on a disc positioned below the cylindrical body,
   wherein the one or more retaining surface(s) are carried by the disc arranged at the base of the drive mechanism in which the disc has a larger diameter than the diameter of the drive mechanism in the section supporting the one or more drive ramp(s), and wherein the one or more retaining surface(s) extend roughly radially to the drive mechanism and in that the disc comprises, between two successive retaining surfaces, a peripheral edge extending in a spiral.

2. The electrical food preparation device of claim 1, wherein the one or more retaining surface(s) are arranged at a greater radial distance from the longitudinal axis of the drive mechanism than the one or more drive ramp(s).

3. The electrical food preparation device of claim 1, wherein the retaining surface extends parallel to the axis of the drive mechanism or is sloped downward.

4. The electrical food preparation device of claim 1, wherein the one or more drive ramp(s) are in a spiral shape.

5. The electrical food preparation device of claim 1, wherein the drive mechanism comprises three drive ramps spaced 120° apart from one another.

6. The electrical food preparation device of claim 1, wherein the drive mechanism comprises three retaining surfaces spaced 120° apart from one another.

7. The electrical food preparation device of claim 1, wherein the drive mechanism is arranged in a bottom of a working container.

8. The electrical food preparation device of claim 7, wherein the device comprises a safety mechanism that can suddenly stop the rotation of the drive mechanism.

9. The electrical food preparation device of claim 8, wherein the working container is closed by a lid and wherein the safety mechanism stops the motor upon opening the lid.

* * * * *